PLATED WIRE MEMORY

Filed Jan. 30, 1967 3 Sheets-Sheet 1

*INVENTOR.*
RICHARD J. PROSEN, DECEASED
by ROSEMARY E. PROSEN
*BY* SPECIAL ADMINISTRATRIX
Robert O. Vidas
ATTORNEY Jan. 27, 1970 R. J. PROSEN 3,492,666

PLATED WIRE MEMORY

Filed Jan. 30, 1967 3 Sheets-Sheet 2

INVENTOR.
RICHARD J. PROSEN, DECEASED
by ROSEMARY E. PROSEN
BY SPECIAL ADMINISTRATRIX
Robert O. Vidas
ATTORNEY INVENTOR.
RICHARD J. PROSEN, DECEASED
by ROSEMARY E. PROSEN
BY SPECIAL ADMINISTRATRIX
Robert O. Vidas
ATTORNEY United States Patent Office 3,492,666
Patented Jan. 27, 1970

3,492,666
PLATED WIRE MEMORY

Richard J. Prosen, deceased, late of Hopkins, Minn., by Rosemary E. Prosen, special administratrix, Hopkins, Minn., assignor to Honeywell Inc., Minneapolis, Minn., a corporation of Delaware Filed Jan. 30, 1967, Ser. No. 613,721
Int. Cl. G11b *5/62*
U.S. Cl. 340—174 6 Claims

ABSTRACT OF THE DISCLOSURE

A memory storage of the plated wire type which has modular construction with orthogonal arrangement in an *x–y* plane of word modules and digit modules. Fan-out of individual word or digit lines and lead connection thereto is provided on a *y–z* surface of the individual modules.

BACKGROUND OF THE INVENTION

The present invention is directed to a large capacity, high speed plated wire magnetic memory. More specifically, the present invention is directed to such a large capacity plated wire memory wherein the memory is composed of a plurality of modules.

A wide variety of magnetic techniques have been utilized in the formation of high capacity magnetic memories. In the early period of magnetic memories, ferrite core material was utilized for storage of information. While such ferrite cores have provided usable memories, they are limited in two important respects. First, the ferrite material possesses disadvantages insofar as the maximum switching speed is concerned. Second, even using highly sophisticated techniques the ferrite core's individual size makes prohibitive the manufacture of very large capacity memories possessing sufficiently high speed in accordance with the requirements of computer usage. Therefore, intensive research effort has been directed to utilization of thin films of magnetic material, primarily films of a metallic nature.

Initial use of thin films was in a "two-dimensional" dot technique. However, a two-dimensional dot technique does not provide the good magnetic coupling and closed loop magnetic flux paths necessary in order to achieve high density in computer construction. A variety of techniques have been utilized in improving the performance of such two-dimensional film arrays. However, thin film magnetic efforts have more recently been directed to plated wires. The present invention is directed to such a thin film magnetic memory concept.

SUMMARY OF THE INVENTION

In the construction of any large magnetic memory several items must be considered in order to keep reliability and cost within reasonable bounds. A modular construction is one of the important considerations. If one considers a memory plane containing, for example, sixteen million bits, it is clear that any system incorporating this large number of bits must be one which will inherently contain some bits which will not perform in accordance with the desired results. When such malfunctioning is detected a ready replacement of the unsatisfactory portion must be possible.

A second important consideration is that of total size of the memory system. As larger and larger capacity memories have been built of materials which possess faster and faster switching times, a limiting factor on the speed of the computer has been the transmission time of the electrical signals therethrough. The limiting factor is tied to the fact that electrical signals are propagated at a rate of approximately one foot per nanosecond. If a memory is constructed wherein the word and digit lines are of excessive length, the delay of transmission of electrical signals poses many difficulties, for example, time of transmission of pulses, the timing of coincident passage of current through the conductors, etc.

Through the use of a wire having a magnetic thin film plated thereon one can accomplish a high degree of density of the individual bits as well as achieve relatively short current conducting paths. One of the difficulties that arises in such plated wire memories is the difficulty of achieving electrical contact to the individual lines forming the memory. In the past, a fan-out technique in the plane of the memory has been used. However, when one attempts to construct large capacity memories involving many thousands of individual lines, space considerations make such electrical contact extremely difficult in using fan-out in a conventional sense. The construction of the present invention provides a means for overcoming this difficulty.

BRIEF DESCRIPTION OF DRAWINGS

The invention will be best understood from a study of the specification and drawings wherein.

DESCRIPTION OF PREFERRED EMBODIMENT

Figure 1:
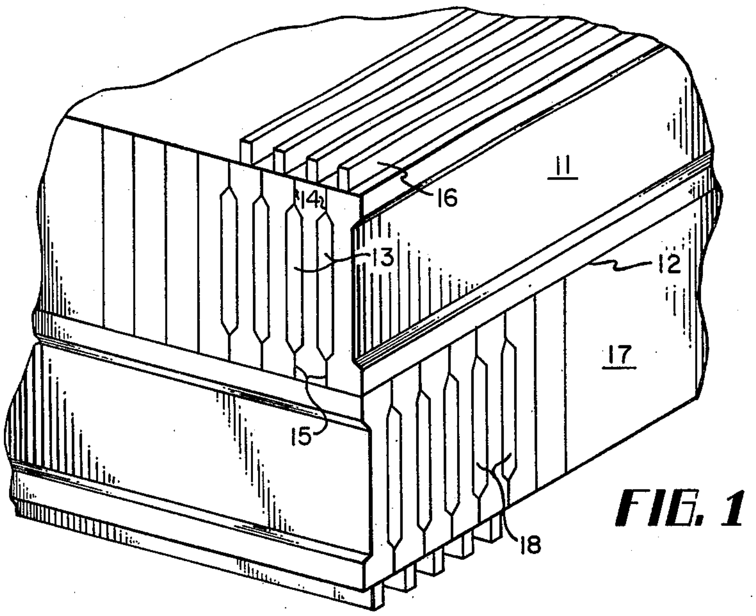
FIGURE 1 is a schematic illustration of a memory stack configuration in accordance with the present invention.

Referring now to the drawings, in FIGURE 1 there is illustrated in generally schematic form a memory stack assembly in accordance with the present invention. The memory stack consists of a series of individual word board modules 11 mounted in such a manner as to have the surface containing the word lines in a common plane 12. The word boards have recessed regions 13 along the sides thereof for accomplishing the lead connections and as a region which may contain certain circuitry features necessary for the operations of the overall memory stack. Alignment of the boards is accomplished by placing in juxtaposition individual modules so as to contact at the broader portions 14 and 15 respectively. Electrical connection to the individual word boards is facilitated by regions 16 which project beyond the contact regions 14. Specific details of the individual module construction will be described with particularity below.

In orthogonal mounting relationship with regard to the word boards are digit boards generally indicated 17. As in the case of the word boards recessed regions 18 are provided on opposing side surfaces of the digit boards for making electrical contact to the individual digit lines as well as providing a place for location of associated circuitry for line selection and the like. The digit lines are located in the plane between the word boards and the digit boards generally designated 12.

As a prerequisite for obtaining good magnetic coupling between the word board lines and the digit board lines it is necessary that a high degree of flatness of the overall surface 12 be obtained in the total assembly. That is, the word boards need be substantially flat both along their length and across the series of modules. The same requirement is true for the digit board. This can be accomplished as will be described below.

If one is to achieve a large capacity memory of approximately sixteen million bits in a single plane of the type previously described with regard to FIGURE 1, it is necessary that there be $16\times10^6$ intersections which is desirably brought about by 4,000 word lines intersecting with 4,000 digit lines. The description which follows is made for 3 mil diameter wire that has center-to-center spacing of either word or digit lines of about 3 mils. It is readily seen that the total width of the word or digit line plane would be at least 12 inches. If the presumption is made that center-to-center spacing is about 10 mils then the overall width of the plane would be 40 inches. Correspondingly, the length of the lines which are orthogonal must be this long as well. Where a system is of this latter size, it would take over 3 nanoseconds for a pulse of current to traverse the lines. Such a system is, of course, clearly operable. However, the mere bulk of such a system dictates that it would have to be either subdivided into a series of memory planes of smaller size or the center-to-center spacing of lines be reduced by some other technique in order to make the memory more compact.

Figure 4:
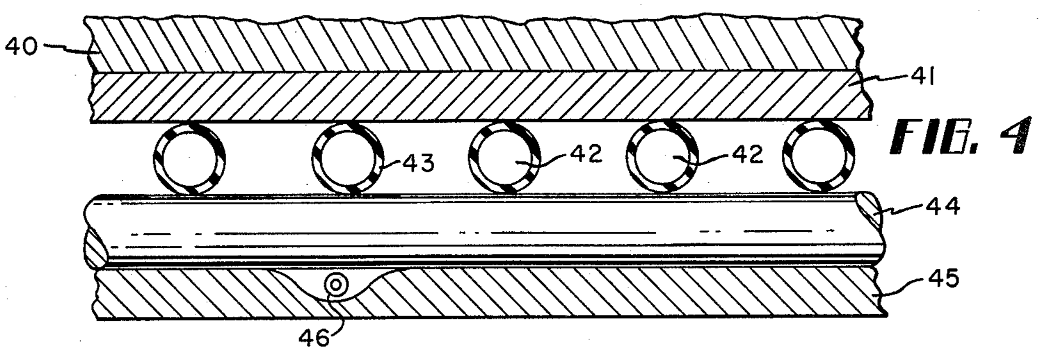
FIGURE 4 is a sectional view of a word line configuration of a memory stack in accordance with the present invention.

The nature of the construction of the word line configurations in accordance with one form of the invention is illustrated in FIGURE 4 which is a cross sectional view of a portion of a word line module. Also shown is one digit line and its supporting substrate. A word module support member 40 which may be of a metal such as aluminum has located on the surface thereof a magnetic keeper material 41 which may be metallic or of ferrite composition. The keeper material should possess a low coercivity (about one oe.) and may be relatively thin. Bonded to the surface of the ferrite material are a plurality of word lines 42 of, for example, copper material coated with some suitable insulating and bonding material 43 such as Formvar. The bonding need not be of a high order of strength. The only function is to keep the word lines in their original position. The function of the ferrite keeper is to confine the region of magnetic field generated by passage of current through the individual word line so as to avoid interference with adjacent word lines. Also shown is a digit line 44 which has a thin film of magnetic material plated on the surface (not shown). The digit line is in turn insulated with some material such as Formvar which also may act as a bonding agent to the base of the digit module 45. Passage of a current through one of the word lines tends to produce an image current 46 in the ground plane 45 underlying the digit line 44. The net effect of a passage of current through a word line and the resultant image current is to provide an effect on the digit line closely akin to having an entire wrap of the word line about the digit line.

The preceding discussion of the preferred form of the arrangement of word lines should not be taken to indicate that other configurations cannot be used. The absence of a keeper material is feasible although a broadening of the extent of the image current along the substrate underlying the digit line takes place giving less sharp definition to the bit of the digit line. This, to some extent, is counterbalanced by the reduced inductance of a system without the magnetic keeper.

Figure 5:
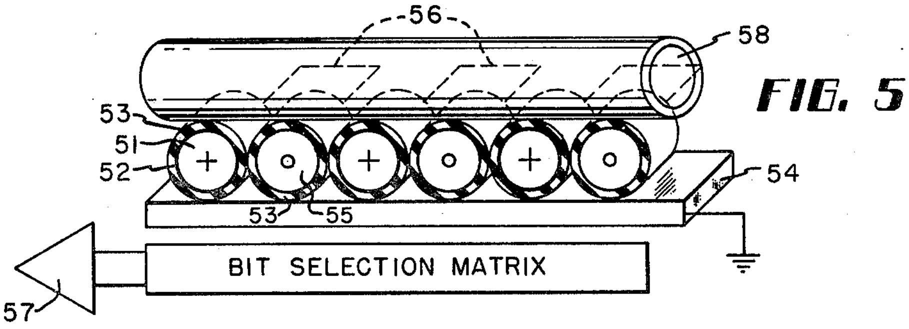
FIGURE 5 is a schematic illustration of a digit line configuration in accordance with the present invention.

Turning now to FIGURE 5 there is schematically shown the preferred form of arrangement of the digit lines in the invention. Digit line 51 which is plated with a thin film (less than 10,000 A.) of magnetic material 52—electroplated Permalloy, for example—which is in turn coated with an insulating material 53 is mounted in bonded relationship to a digit module 54. Adjacent to the plated digit line 51 is a plain copper wire 55 having an insulating film 53 on the surface thereof. Lines 51 and 55 are connected at one end thereof by means generally indicated as 56 with the opposite ends connected to a bit selection matrix as indicated. This type of configuration is a balanced, one-core per bit type. The result is efficient noise cancellation. Also shown is a sense amplifier 57 and an insulated word line 58 passing orthogonally across the plane of the digit lines.

Various other digit line configurations are possible. For example, one may have both paired lines 51 and 55 plated with magnetic material. Such a configuration produces good noise cancellation and doubles signal output as there are two cores per bit.

A still further procedure that may be used is to provide a metallic mounting block for a module base and ground all of the digit lines at one end thereof. An image current is then produced when all of the digit lines contain a magnetic plating and some degree of noise cancellation is secured.

Figures 2A, 2B:
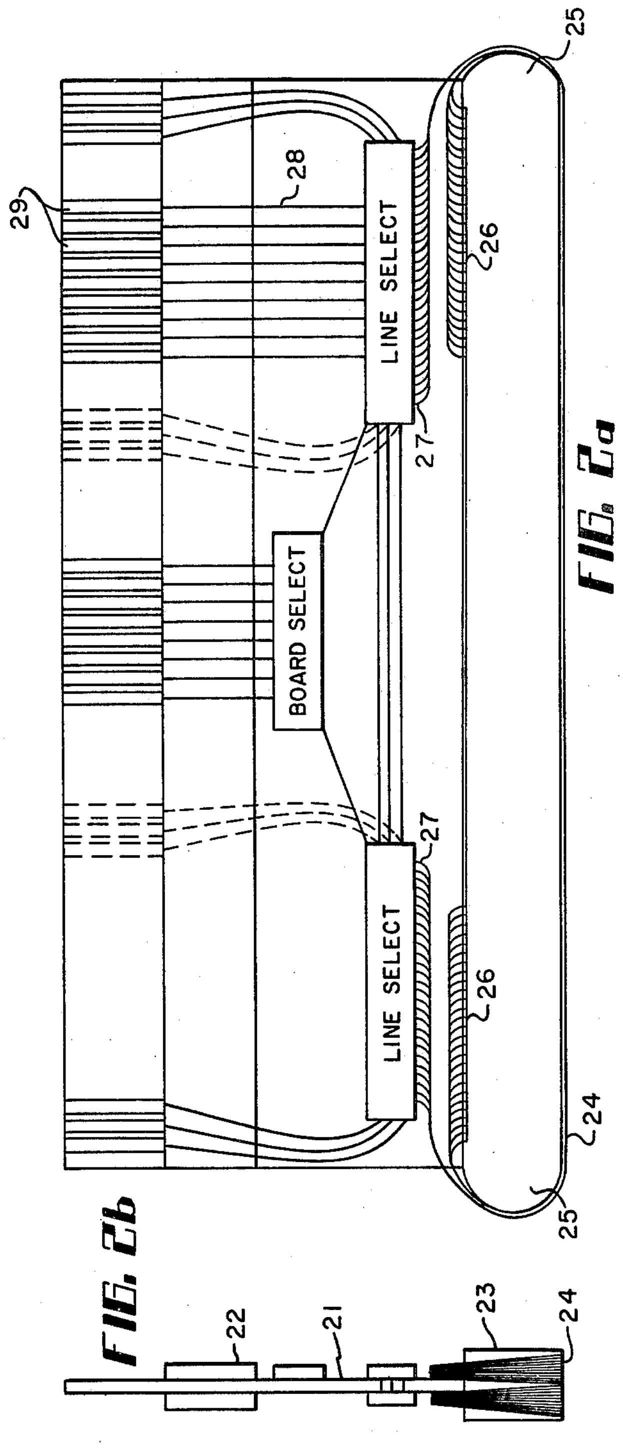
FIGURES 2*a*, 2*b* and 2*c* are front, end, and side views respectively of an individual module of a word board in accordance with the present invention.
Figure 2C:
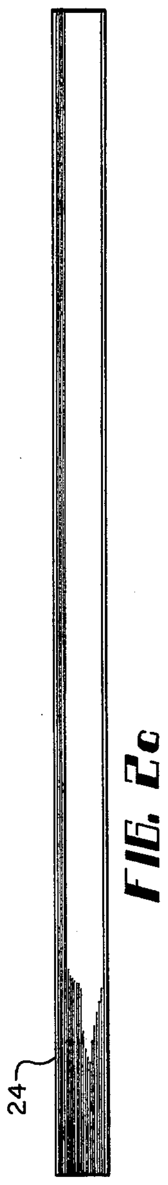

Turning now to FIGURES 2*a*, 2*b* and 2*c*, there is illustrated three views of a word board module in accordance with the present invention. The main word board mounting member 21 has extensions at positions 22 and 23 from the sides thereof to produce some overall board width of predetermined size. For the purpose of the present explanation it will be presumed that this overall width is approximately 0.35 inch. The total width of region 23 includes the mounting surface 24 (which is in what will be termed the $x$–$y$ plane, the $y$ direction being the long axis of the board) for the individual word lines. Region 22, which is preferably of the same width as region 23, is utilized as a guide means for holding in alignment a series of individual word boards mounted in a memory stack in accordance with FIGURE 1. This base mounting member 21, 22, 23, is preferably of some metallic material which is treated on certain of its surfaces to provide an insulating surface. If aluminum is used an anodized surface is useful for providing insulation where desired. To permit electrical interconnection of a series of the digit boards the side surfaces of conductive member 23 should be exposed so as to make electrical contact with the adjacent word module. Member 23 is rounded on the ends thereof as shown at 25. This is to provide a path for the "non-working" ends of the word lines to pass into the $z$ axis direction for making electrical contact onto the $y$–$z$ plane of the module in the recessed portions thereof. Alternate word lines go to a ground connection 26 while the opposite end of the word line connects to a line select connection 27.

As has been previously noted a major problem in the fabrication of a plated wire memory is the need for fan-out of the digit and word lines for connection to circuitry associated with the memory. By passing the word lines over the surface 25 and into the $y$–$z$ plane surface for connection there is provided an effective way of fanning out the word lines to provide a simple means of connection with adequate space. By making the connections on the $y$–$z$ plane two directions of freedom are provided thereby facilitating soldering or welding of the individual word lines. A variety of techniques may be utilized to make word line connection tabs. These tabs are in turn electrically connected to the additional circuitry such as line select circuitry is shown. The line select member is desirably an integral unit which plugs into the base mounting member 21. Printed circuit techniques can advantageously be used to provide both the connecting tabs for the individual word lines as well as providing connecting points for the line select matrix.

The advantages of such a system are numerous. If the line select matrix should prove defective the entire module does not have to be rewired. A replacement line select is merely plugged in. Conversely, salvage of line select matrix is possible where word lines prove to be defective.

Extending from the opposite side of the line select matrix are a series of leads 28 (which may also be produced by printed circuit techniques) which terminate in connection tabs 29 on member 21. Snap-on lead connections are readily made to these terminal tabs. Also illustrated in the figure is a board select member with its associated connection tabs and leads extending to the edge of the board in one mode of providing connection means to external circuitry.

Figure 3:
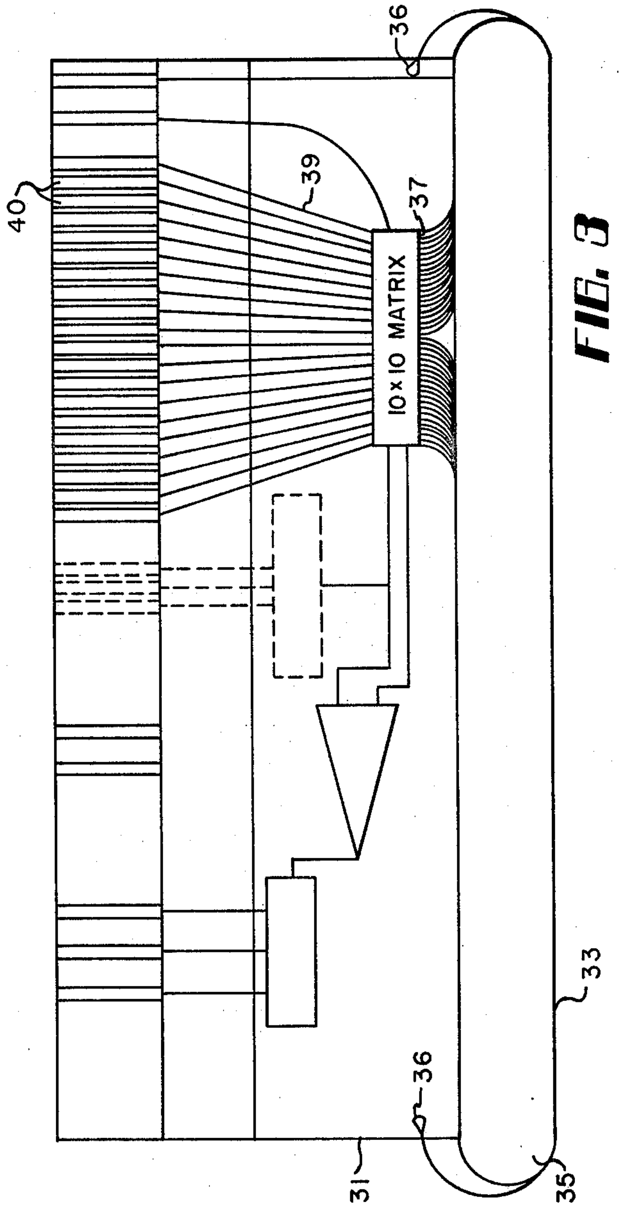
FIGURE 3 is an individual module of a digit board in accordance with the present invention.

The procedure for producing a digit board is analogous to that described above in producing a word module. As shown in FIGURE 3, the individual digit lines pass across the surface of member 33 which is a broadened portion of the main module 31. The individual digit lines pass about a curved surface 35 in a manner analogous to that described for the word lines. The interconnection of digit lines shown in FIGURE 5 as connection 56 is shown in FIGURE 3 generally as connect 36. The other ends of the digit lines connect to a *y–z* plane to a series of tabs generally indicated 37. These tabs in turn are connected by individual conductors (not shown) which in turn provide connecting means for a 10×10 matrix 38 which is used to select digit lines. This matrix in turn is connected electrically by leads 39 to connection tabs 40 at the edge of the board. Also shown in the figure is a schematic illustration of associated circuitry of the type generally utilized with magnetic memories.

Figures 6A, 6B:
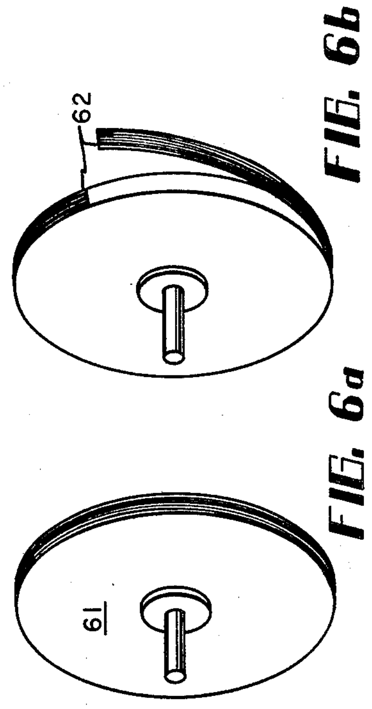
FIGURES 6*a* and 6*b* are sequential steps in the formation of word and digit lines in accordance with the present invention.

As has already been noted, an important requirement of manufacturing a memory in accordance with the present invention is the flatness of the memory plane bed wherein intersection of the word lines and the digit lines takes place. The small diameter of the wire to be utilized in manufacturing such a memory makes it a difficult problem to achieve both straight individual word and digit lines and planar interfaces in the assembly. FIGURE 6*a* illustrates a technique useful in providing both the desired flatness and the necessary alignment of the individual lines to make fullest use of the capabilities of the invention. A mandrel member 61 is provided which has on the surface thereof a thin layer of detachable material which will comprise the substrate of the digit or word lines respectively. The wire to be utilized as either the digit line or the word line is wound upon the mandrel so as to provide the proper length and spacing of the individual lines. When the wire to be used has been wound so as to provide the desired number of individual parallel lines a cut is made through the ends as indicated at 62 thus giving word or digit lines of the desired length. The surface of the thin detachable film may be appropriately treated to provide the necessary degree of adhesion to the digit or word line material. A portion of the surface of this removable substrate is left in a non-tacky condition so as to leave free ends for some distance to each side of a point 62. This gives free ends of digit or word lines for contact to the *y–z* plane previously discussed. This entire assembly may be positioned on the surface 24 (or its counterpart in the digit board) and bonded by any of a wide variety of techniques to this surface. The free ends are then available for further connection.

No specific discussion has been heretofore made of the nature of the plating on the digit lines or magnetic material. As this forms no direct part of the present invention it will suffice to indicate that the common nickel-iron electroplated deposit known in the art may be advantageously used for this purpose. Likewise, one may use various electrolessly plated magnetic deposits to produce the necessary thin film of magnetic material on the digit lines.

The insulating material coating the wires which has been noted as possibly being Formvar can be of a variety of other materials. The advantage of Formvar is that it does provide an adhesion material for holding the wires in place along the surfaces of the digit and word lines and also is a good electrical insulator.

Likewise, the procedures used for providing connecting tabs in the *y–z* portion of the modules can be of various types. One useful procedure is to use a thin plastic member which is coated with a film of copper and etched to provide necessary tabs and other circuit lines in a printed circuit technique. Such a member can be bonded to a *y–z* plane.

The embodiments of the invention in which an exclusive property or right is claimed are defined as follows:

I claim:

1. A module for a plated wire thin film magnetic memory comprising:

(a) a mounting member having a plane surface which is substantially flat and of elongated configuration and which can be characterized as having *x–y* coordinate directions with the elongated direction being along the *y* coordinate thereof, said member having surfaces which can be characterized as having generally *y–z* coordinates, at least one of said *y–z* surfaces having at least a portion thereof recessed;

(b) a plurality of contact means in electrical isolation from one another mounted on the recessed portions of the *y–z* surface of said mounting member;

(c) a plurality of parallel electrically conducting wires in contiguous electrically insulated relationship to said *x–y* plane surface and extending beyond the *y* direction ends thereof and into individual electrical connection with said contact means.

2. A module in accordance with claim 1 wherein line select means are mounted to said recessed regions and in electrical engagement with said contact means.

3. A module in accordance with claim 1 wherein at least the *x–y* plane of the surface of said mounting member is an electrically conducting material.

4. A module in accordance with claim 1 wherein said wires have a coating of metallic magnetic material having a substantially square hysteresis loop on the surface thereof.

5. A module in accordance with claim 1 wherein alternate of said wires have a coating of metallic magnetic material having a substantially square hysteresis loop on the surface thereof.

6. A module in accordance with claim 1 wherein a magnetic keeper material underlies said wires.

References Cited

UNITED STATES PATENTS 3,371,326 2/1968 Fedde ------------- 340—174

OTHER REFERENCES

Publication I—IBM Technical Disclosure Bulletin, vol. 8; No. 9, February 1966, pp. 1263–1264.

JAMES W. MOFFITT, Primary Examiner